(12) United States Patent
Shigetaka (10) Patent No.: US 8,575,995 B2
(45) Date of Patent: Nov. 5, 2013

(54) CAPACITANCE TYPE INPUT DEVICE

(75) Inventor: Hiroshi Shigetaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 139 days.

(21) Appl. No.: 13/361,233

(22) Filed: Jan. 30, 2012

(65) Prior Publication Data

US 2012/0229196 A1    Sep. 13, 2012

(30) Foreign Application Priority Data

Mar. 10, 2011    (JP) ................................. 2011-052556

(51) Int. Cl.
*H03K 17/96*    (2006.01)

(52) U.S. Cl.
USPC ........................................................ 327/517

(58) Field of Classification Search
USPC .................. 327/509, 517, 564, 565
See application file for complete search history.

(56) References Cited

U.S. PATENT DOCUMENTS

| 4,321,479 | A | * | 3/1982 | Ledniczki et al. | ............ 307/116 |
| 6,825,890 | B2 | | 11/2004 | Matsufusa | |
| 8,395,587 | B2 | * | 3/2013 | Cauwels et al. | ............... 345/173 |
| 8,441,458 | B2 | * | 5/2013 | Rimon et al. | ................. 345/173 |
| 8,456,444 | B2 | * | 6/2013 | Ishizaki et al. | ................ 345/174 |

FOREIGN PATENT DOCUMENTS

JP    2010-218535    9/2010

* cited by examiner

*Primary Examiner* — Jeffrey Zweizig
(74) *Attorney, Agent, or Firm* — Brinks Hofer Gilson & Lione

(57) ABSTRACT

A detection electrode and an X-driving electrode (first driving electrode) are stacked through a sensor side insulating layer, at the side of a sensor portion of a film base material, and a Y-driving electrode (second driving electrode) is formed on the same forming surface as the detection electrode. The X-driving electrode is formed of a first conductive layer, the detection electrode and the Y-driving electrode are formed in a stacked structure of a second conductive layer having a resistance lower than the first conductive layer and a third conductive layer having a resistance higher than the first conductive layer and the second conductive layer.

11 Claims, 7 Drawing Sheets

CAPACITANCE TYPE INPUT DEVICE

CLAIM OF PRIORITY

This application claims benefit of Japanese Patent Application No. 2011-052556 filed on Mar. 10, 2011, which is hereby incorporated by reference in its entirety.

BACKGROUND

1. Field of the Disclosure

The present disclosure relates to a capacitance type input device that detects the approach of a finger from a change in the capacitance between a driving electrode and a detection electrode, and particularly, to the layer configuration of electrodes.

2. Description of the Related Art

Japanese Unexamined Patent Application Publication No. 2003-271311 discloses a capacitance type input device including a sensor portion where an electrode pattern is formed on a film base material and a circuit portion formed on a rigid substrate. The electrode pattern is formed of an ITO film in Japanese Unexamined Patent Application Publication No. 2003-271311.

Further, Japanese Unexamined Patent Application Publication No. 2010-218535 discloses a capacitance type input device where at least a portion of a driving electrode and a detection electrode is formed of a conductive layer containing carbon. The invention described in Japanese Unexamined Patent Application Publication No. 2010-218535, it is described that it is possible to reduce costs by implementing the electrode with a conductive layer containing carbon.

As a driving electrode and a detection electrode are formed, it is required to reduce costs and implement a layer configuration according to the necessary function of each layer.

Further, it is required to make the layer configuration of a ground layer or a circuit wiring layer appropriate, in a configuration where the ground layer or the circuit wiring layer is formed, with the opposite side to the sensor portion side of the film base material as a circuit portion.

Further, an appropriate layer configuration is also necessary to reduce costs and ensure insulation in an insulating layer used for the sensor portion or the circuit portion.

SUMMARY

A capacitance type input device includes a detection electrode and a first driving electrode where voltage is applied which are stacked through a sensor side insulating layer, at a sensor portion side of a film base material, and detects a change in capacitance between the input device and the first driving electrode by using the detection electrode, in which the first driving electrode is formed of a first conductive layer and the detection electrode is formed in a stacked structure of a second conductive layer having a resistance lower than the first conductive layer and a third conductive layer having a resistance higher than the first conductive layer and the second conductive layer.

DESCRIPTION OF THE EXEMPLARY EMBODIMENTS

Figure 1:
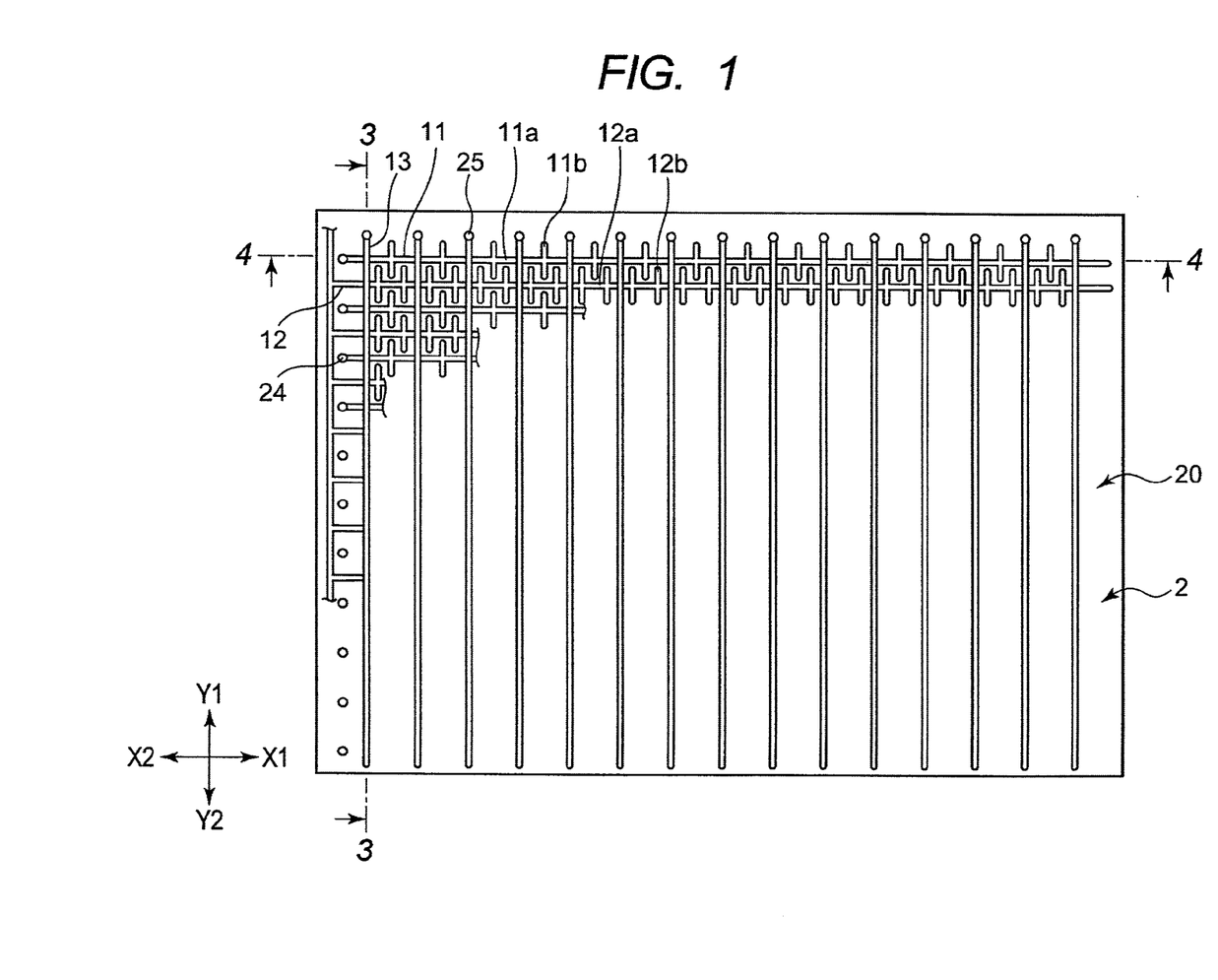
FIG. 1 is a plan view of a capacitance type input device according to an embodiment.
Figure 2:
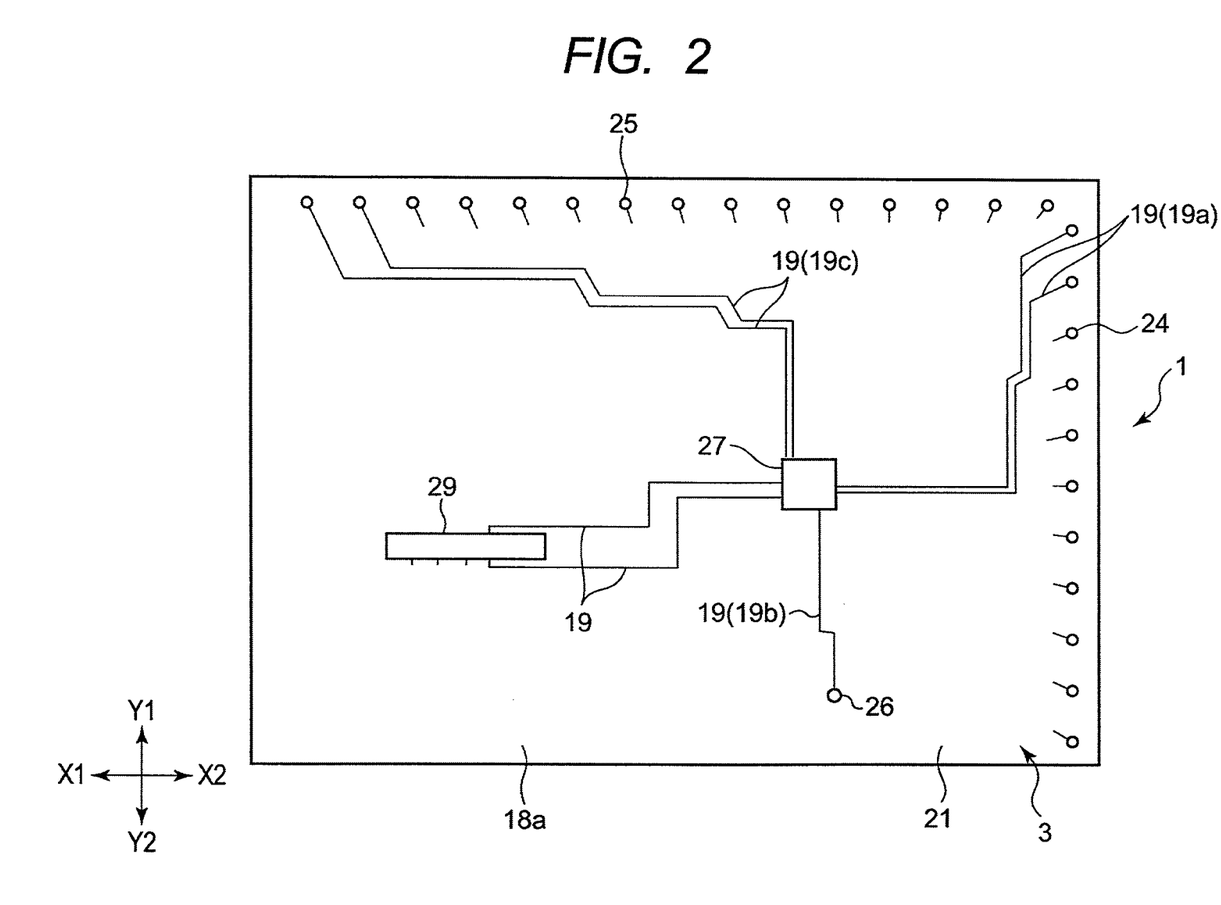
FIG. 2 is a rear view of a capacitance type input device according to the embodiment.
Figure 3:
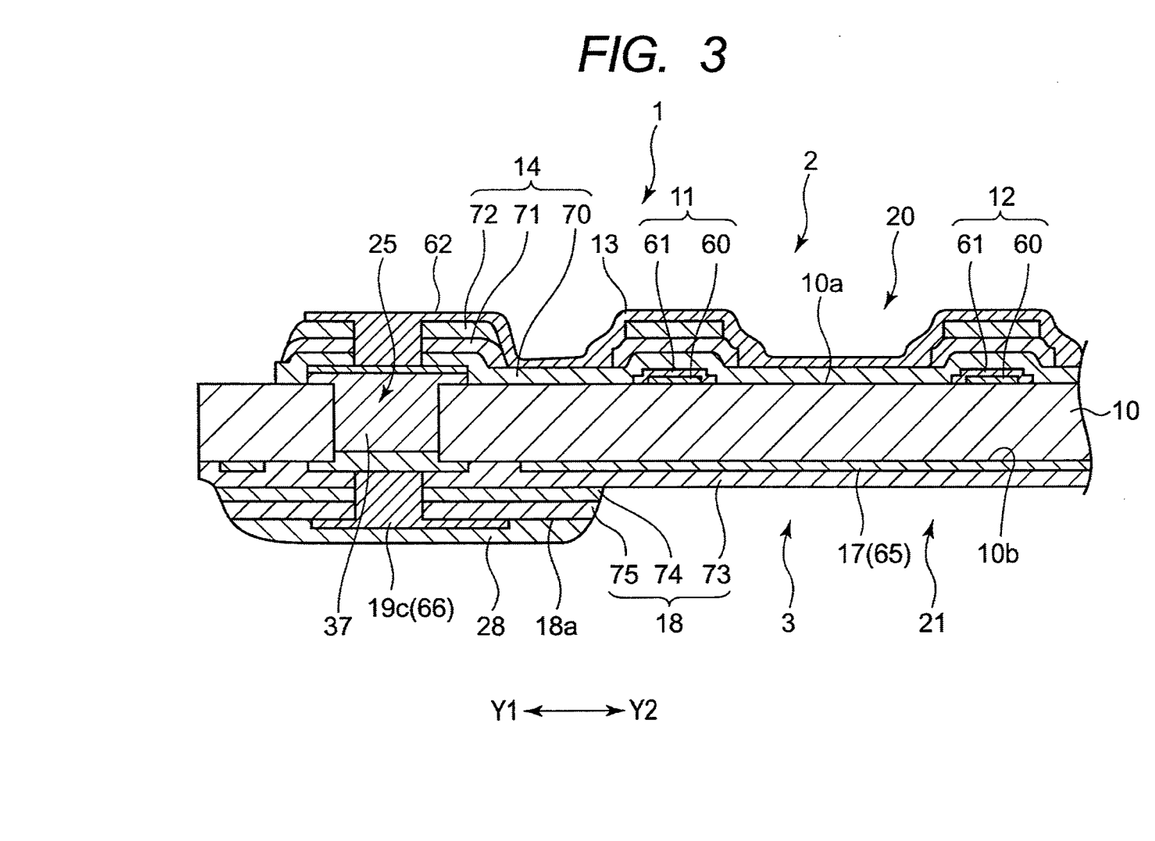
FIG. 3 is a partial enlarged longitudinal cross-sectional view of the capacitance type input device, taken along the line A-A of FIG. 1 and seen in the direction of the arrow.
Figure 4:
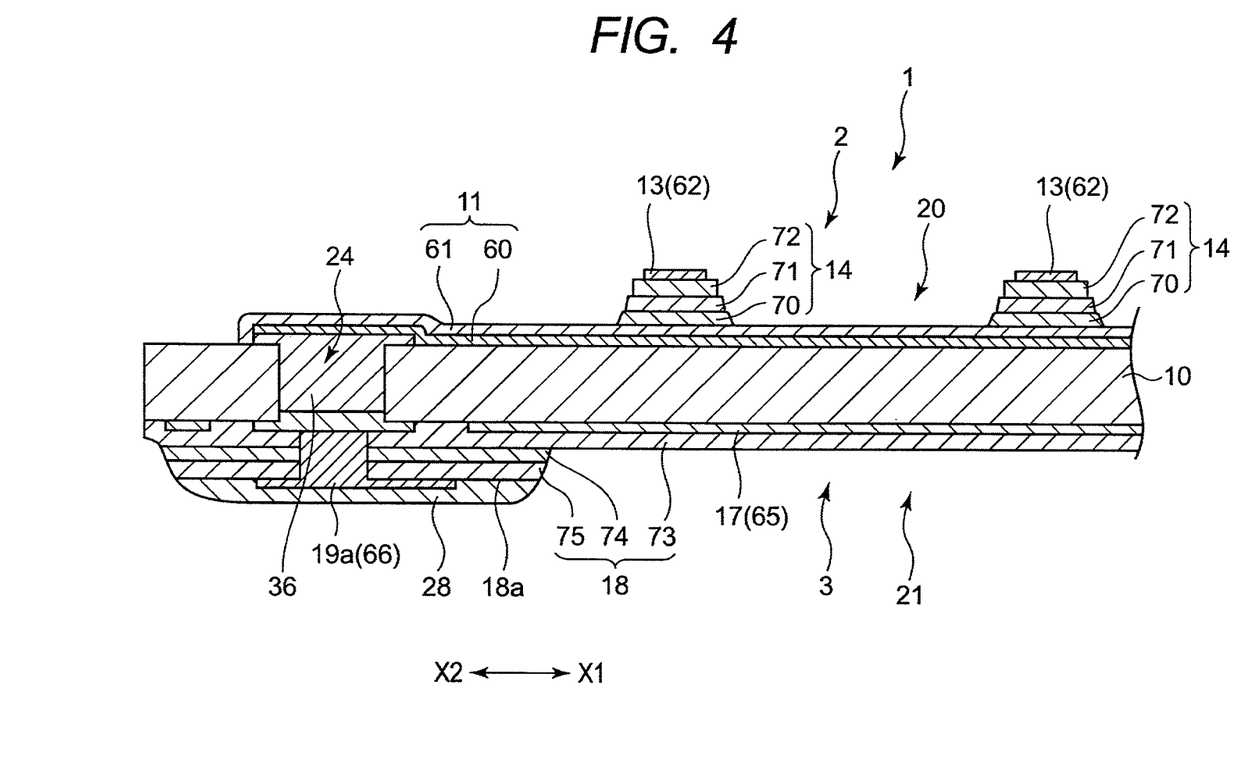
FIG. 4 is a partial enlarged longitudinal cross-sectional view of the capacitance type input device, taken along the line B-B of FIG. 1 and seen in the direction of the arrow.
Figure 5:
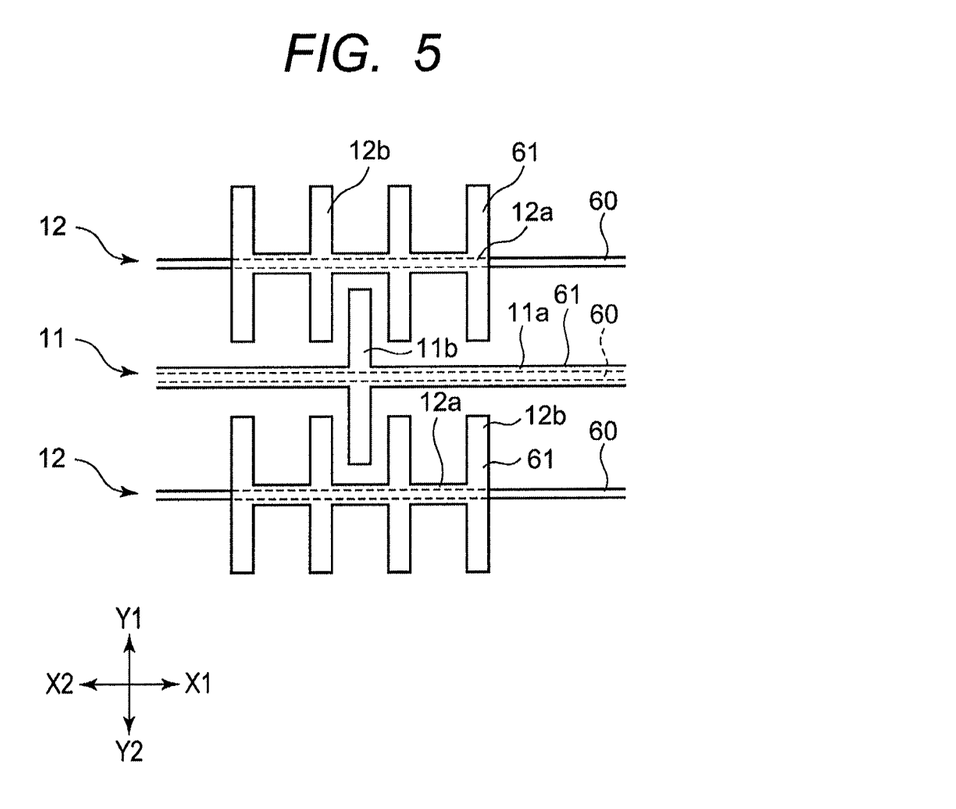
FIG. 5 is a partial enlarged plan view of a Y-driving electrode and a detection electrode according to the embodiment.
Figure 6:
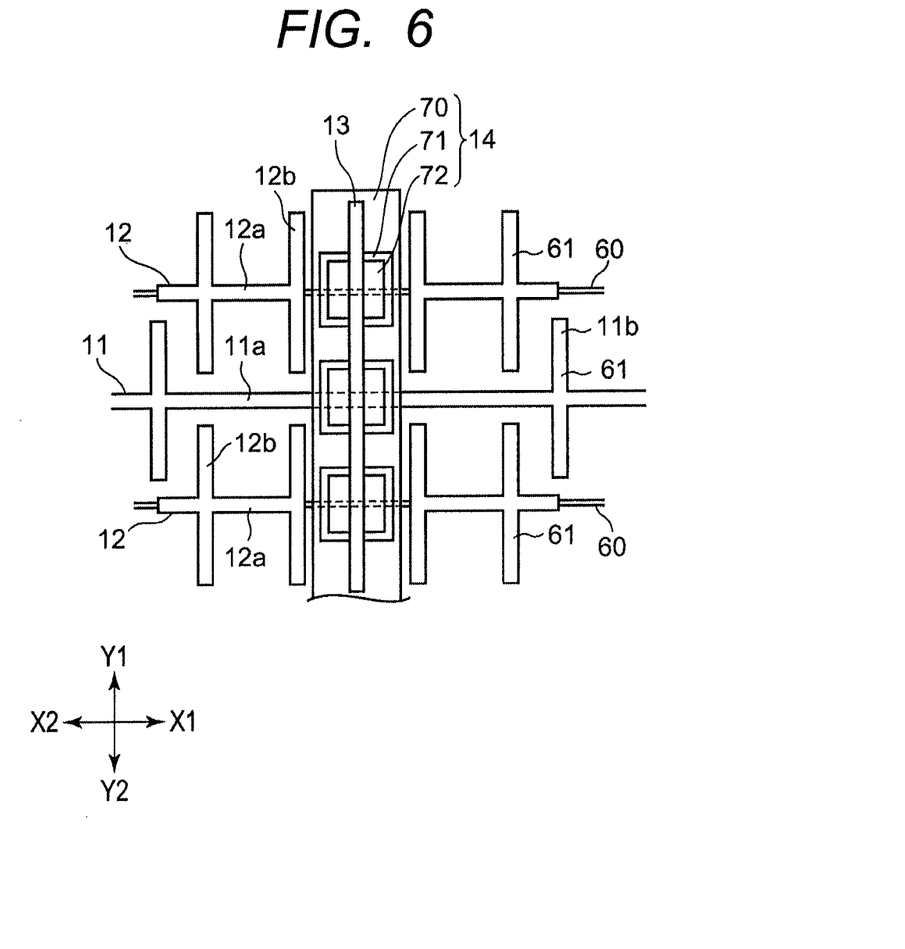
FIG. 6 is a partial enlarged plan view of a sensor portion according to the embodiment.
Figure 7:
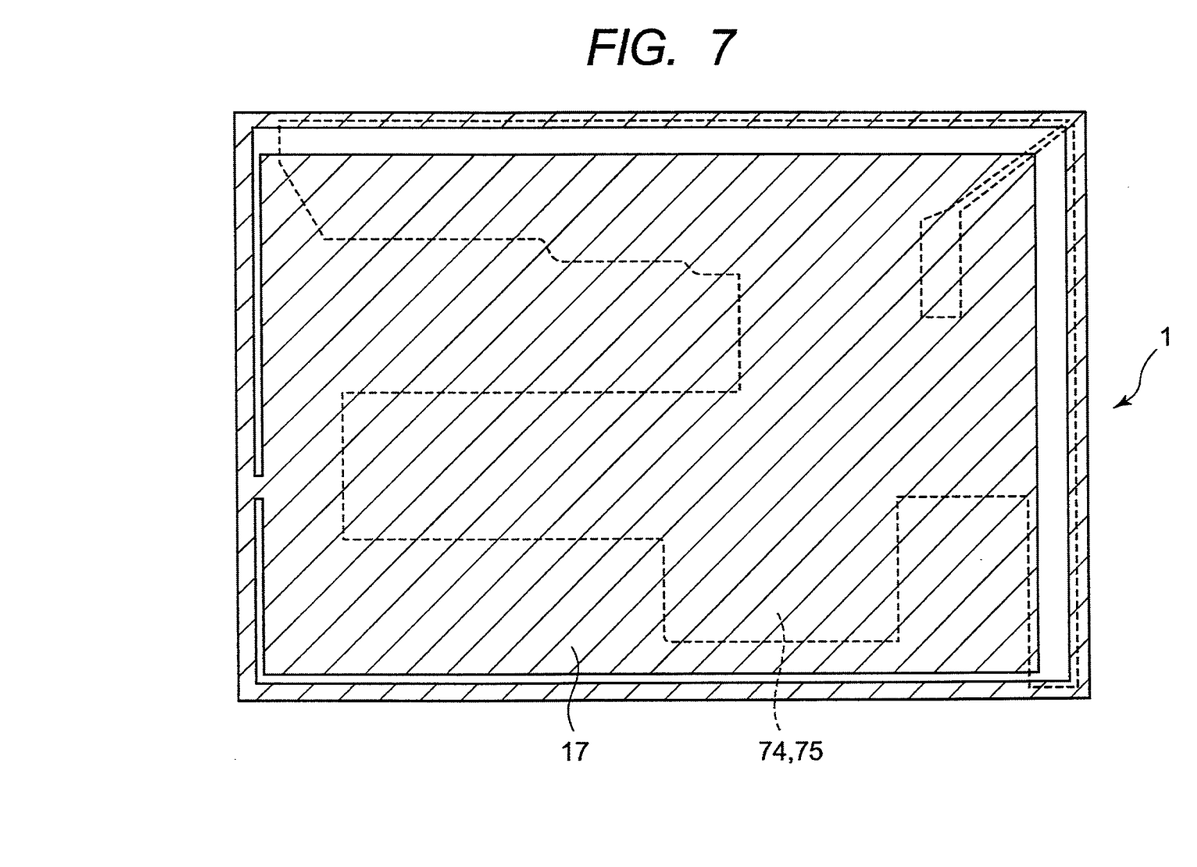
FIG. 7 is a rear view illustrating a ground layer where a circuit portion is disposed and a formation region of a partial insulating layer according to the embodiment.

FIG. 1 is a plan view of a capacitance type input device 1 according to an embodiment, FIG. 2 is a rear view of the capacitance type input device 1, FIG. 3 is a partial enlarged longitudinal cross-sectional view taken along the line A-A of FIG. 1 and seen in the direction of the arrow, FIG. 4 is a partial enlarged longitudinal cross-sectional view taken along the line B-B of FIG. 1 and seen in the direction of the arrow, FIG. 5 is a partial enlarged plan view of a Y-driving electrode and a detection electrode according to the embodiment, FIG. 6 is a partial enlarged plan view of a sensor portion according to the embodiment, and FIG. 7 is a rear view illustrating a ground layer where a circuit portion is disposed according to the embodiment and a formation region of a partial insulating layer.

As shown in the cross-sectional views of FIGS. 3 and 4, the capacitance type input device 1 has a front side 2 and rear side 3. FIG. 1 shows the capacitance type input device 1 seen from the front side 2 and FIG. 2 shows the capacitance type input device 1 seen from the rear side 3.

As shown in FIG. 1, X-driving electrode (first driving electrode) 13, a Y-driving electrode (second driving electrode) 11, and a detection electrode 12 are disposed at substantially all regions of the front side 2. Further, a reference numeral 13 is given to one X-driving electrode in FIG. 1. Further, only some portions of the Y-driving electrode and the detection electrode are shown in FIG. 1 and the reference numerals 11 and 12 are given to one Y-driving electrode and one detection electrode, respectively.

The electrodes 11, 12, and 13 are patterned by printing.

As shown in FIGS. 3 and 4, the capacitance type input device 1 a flexible film base material 10 formed of a resin film or a resin sheet. The synthetic resin of the film base material 10 is, for example, PET (polyethylene terephthalate).

The front side 2 of the film base material 10 forms a sensor unit 20, and a plurality of Y-driving electrodes 11 and a plurality of detection electrodes 12 shown in FIG. 1 are formed, directly or an insulating layer therebetween, on the surface 10a of the film base material 10.

A sensor side insulating layer 14 is disposed on the surfaces of the Y-driving electrode 11 and the detection electrode 12 and the X-driving electrode 13 is formed on the sensor side insulating layer 14. The surface of the X-driving electrode 13 is covered with a surface insulating layer, which is not shown.

As shown in FIG. 1, the Y-driving electrode 11 has an electrode main body portion 11a extending straight in the X1-X2 direction. The plurality of Y-driving electrodes 11 is formed such that the electrode main body portions 11a extend in parallel with a uniform gap in the Y1-Y2 direction. The detection electrode 12 has an electrode main body portion 12a extending straight in the X1-X2 direction and the plurality of detection electrodes 12 are formed such that the electrode main body portions 12a extend in parallel with a uniform gap in the Y1-Y2 direction. The electrode main body portions 11a of the Y-driving electrodes 11 and the electrode main body portions 12a of the detection electrodes 12 are alternately arranged in the Y1-Y2 direction while the electrode main body portion 11a and the electrode main body portions 12a are parallel to each other.

As shown in FIG. 1, the X-driving electrodes 13 extend straight in the Y1-Y2 direction, in parallel with each other with a uniform gap in the X1-X2 direction.

As shown in FIG. 1, the Y-driving electrode 11 has a branch electrode portion 11b. A plurality of branch electrode portions 11b is formed with a gap in the X1-X2 direction and each is conductively connected with the electrode main body portion 11a and protrudes a short distance in the Y1 direction and the Y2 direction from the electrode main body portion 11a. The detection electrode 12 also has a branch electrode portion 12b. A plurality of branch electrodes 12b is disposed with a gap in the X1-X2 direction. Each of the branch electrodes 12b is conductively connected with the electrode main body portion 12a and protrudes a short distance in the Y1 direction and the Y2 direction from the electrode main body portion 12a.

As shown in FIG. 1, the X-driving electrodes 13 cross the electrode main body portions 11a of the Y-driving electrodes 11 and the electrode main body portions 12a of the detection electrode 12 above them. Further, as the branch electrode 12b is provided to the detection electrode 12, coupling capacitance of the detection electrode 12 and the X-driving electrode 13 can be increased at the intersection of the electrode main body portion 11a of the detection electrode 12 and the X-driving electrode 13 while coupling capacitance of the detection electrode 12 and the X-driving electrode 13 is adjusted without a large variation throughout an operation surface.

Although a branch electrode is not provided to the X-driving electrode 13 in the embodiment shown in FIG. 1, a branch electrode may be provided to the X-driving electrode 13.

The electrode main body portion 11a of the Y-driving electrode 11 and the electrode main body portion 12a of the detection electrode 12 are opposite in parallel to each other while the branch electrode 11b of the Y-driving electrode 11 and a pair of branch electrodes 12b of the detection electrode 12 are arranged opposite to each other in the X1-X2 direction. As the branch electrode 11b and the branch electrode 12b are provided, coupling capacitance of the Y-driving electrode 11 and the detection electrode 12 can be increased while the coupling electrode of the Y-driving electrode 11 and the detection electrode 12 is adjusted without a large different throughout the operation surface.

As shown in FIG. 2, the rear side 3 of the film base material 10 forms the circuit portion 21 and, as shown in FIGS. 3 and 4, a ground layer (shield layer) 17 made of a conductive material is formed on the rear surface 10b of the film base material 10. The ground layer 17 is formed to cover almost the entire area of the operation surface from the rear side. A formation region of the ground layer 17 is hatched in FIG. 7. Except for a through-hole or, when there is a location where the ground layer 17 cannot be formed, the region, the ground layer 17 is formed at substantially all the regions of the front surface 10b.

As shown in FIGS. 3 and 4, the rear surface of the ground layer 17 is covered with a circuit side insulating layer 18. A circuit wiring layer 19 is formed on the rear surface 18a of the circuit side insulating layer 18, as shown in FIGS. 2, 3, and 4. Further, only a portion of the circuit wiring layer 19 is shown in FIG. 2.

As shown in FIG. 2, the circuit wiring layer 19 includes Y-wiring layer 19a, a detection wiring layer 19b, and an X-wiring layer 19c.

As shown in FIG. 1, through-holes 24 and 25 are formed along the edge portion of the operation surface. Further, the reference numerals 24 and 25 are given to one through-hole 24 and 25, respectively, in FIGS. 1 and 2. As shown in FIGS. 3 and 4, the through-holes 24 and 25 are formed through the film base material 10 and filled with conductive layers 36 and 37, respectively. Further, the plurality of Y-driving electrodes 11 and the Y-wiring layer 19a are separately and conductively connected through the conductive layer 36 in the through-hole 24. Similarly, the plurality of X-driving electrodes 13 and the X-wiring layer 19c are separately and conductively connected through the conductive layer 37 in the through-hole 25.

Further, one detecting holes 26 is provided for the detection electrode 12, as shown in FIG. 2, the through-hole 26 is also formed through the film base material 10 and filled with a conductive layer. Further, the detection electrodes 12 are collected in one unit and one detecting wire layer 19b conductively connected with the detection electrode 12 through the through-hole 26 are formed at the circuit portion 21.

The conductive layers 36 and 37 embedded in the through-holes are made of, for example, a conductive material containing silver.

As shown in FIG. 2, an IC package 27 that is an electronic element is mounted on the rear surface 18a of the circuit side insulating layer 18 in the circuit portion 21 and the circuit wiring layer 19 is conductively connected to the circuit in the IC package 27. A driving circuit or a detecting circuit is included in the IC package 27. Further, the circuit wiring layer 19 extends from the IC package 27 and connected to a connector portion 29.

Further, as shown in FIGS. 3 and 4, the circuit wiring layer 19 is covered with the wiring insulating layer 28, such as a resistor. However, the wiring insulating layer 28 is not formed at the portion of the mounting land portion (not shown) and the mounting land portion is exposed. Further, the mounting land portion is formed to overlap the circuit wiring layer 19, and for example, made of a conductive material containing silver.

Voltage is applied in pulse shapes to the Y-driving electrode 11 at uniform time intervals through the Y-wiring layer 19a by the driving circuit in the IC package 27. The voltage with a pulse shape is sequentially applied to the plurality of Y-driving electrodes 11. Further, voltage with a pulse shape is applied to the X-driving electrode 13 at uniform time intervals through the X-wiring layer 19c by the driving circuit and the voltage with a pulse shape is also sequentially applied to the plurality of X-driving electrodes 13. However, voltage is applied to the Y-driving electrode 11 and the X-driving electrode 13 at different times.

Capacitance is generated between the Y-driving electrode 11 and the detection electrode 12. When voltage with a pulse shape is applied to some of the Y-driving electrodes 11, temporary current flows to the detection electrodes 12 adjacent to the Y-driving electrodes 11 where the voltage is applied, simultaneously with the initial rise of the voltage. When a person's finger substantially at the grounding potential comes in contact with the operation surface of the sensor portion 20 and the finger approaches some of the Y-driving electrode 11, capacitance is generated between the finger and the Y-driving electrodes 11 while capacitance is generated between the finger and the detection electrode 12, such that the capacitance between the detection electrode 12 and the Y-driving electrodes 11 close to the finger changes. The amount of current flowing to the detection electrode 12 changes with the change in the capacitance, such that a change is generated between the amount of current flowing to the detection electrode 12 when voltage is applied to the Y-driving electrode 11 close to the finger and the amount of current flowing to the detection electrode 12 when voltage is applied to the Y-driving electrode 11 not close to the finger.

The detecting circuit can estimate the position of a portion that the finger approaches in the Y coordinate, using a change in current value detected through the detection wiring layer 19b from the detection electrode 12 and which Y-driving electrode 11 receives voltage. Similarly, it is possible to estimate the position of a portion that the finger approaches in the X coordinate, using a change in current value and which X-driving electrode 13 receives voltage.

As the branch electrode 11b is formed at the Y-driving electrode 11 and the branch value 12b is formed at the detection electrode 12, it is possible to increase the capacitance between the Y-driving electrode 11 and the detection electrode 12 and it is possible to reduce a difference in coupling capacitance on the operation surface. This is the same as in between the X-driving electrode 13 and the detection electrode 12. Therefore, when a finger comes in contact with any position on the operation surface, it is possible to set resolution for detecting the position of the finger high.

In the capacitance type input device 1 according to the embodiment, as shown in FIGS. 3, 4, and 5, the Y-driving electrodes (second driving electrodes) 11 and the detection electrode 12 are formed in a stacked structure of the second conductive layer 60 and the third conductive layer 61. Meanwhile, the X-driving electrode (first driving electrode) 13 is, as shown in FIGS. 3 and 4, formed of a first conductive layer 62.

The X-driving electrode 13 where voltage is applied may have a higher electrical resistance value than the detection electrode 12, but it is necessary that the electrical resistance value not be too large such that voltage is appropriately applied to the entire X-driving electrode 13 (suppression of voltage drop). Meanwhile, the detection electrode 12 is necessary to have low resistance because it detects a change in current, but when the entire is made of low-resistant conductive material, the costs increase, such that it is preferable to suppress the formation region of the conductive layer at low resistance as much as possible.

In the embodiment, as described above, the X-driving electrode 13 is formed of the first conductive layer 62, the detection electrode 12 is formed in a stacked layer structure of the second conductive layer 60 and the third conductive layer 61, in which the electrical resistance value of the X-driving electrode 13 is adjusted to not be high using a material having an electrical resistance value lower than the third conductive layer 61 at the first conductive layer 62. Meanwhile, although the second conductive layer 60 having a resistance value lower than the first conductive layer 62 in the detection electrode 12, the costs increase when the detection electrode 12 is formed of only the second conductive layer 60, such that the use amount of the second conductive layer 60 as the stacked structure of the low-resistant second conductive layer 60 and the high-resistant third conductive layer 61 is reduced.

As shown in FIG. 5, the second conductive layer 60 is formed straight in the X1-X2 direction. Meanwhile, the third conductive layer 61 overlaps the second conductive layer 60 and has electrode body portions 11a and 12a extending straight with a width larger than the second conductive layer 60 and branch electrode body portions 11b and 12b perpendicular to the electrode main body portions 11a and 12a in the Y1-Y2 direction and shorter than the electrode body portions 11a and 12.

Further, in FIG. 5, the third conductive layer 61 overlaps a portion of the second conductive layer 60 of the detection electrode 12. The third conductive layer 61 of the detection electrode 12 is formed only around the branch electrode 12b, with a portion of the second conductive layer 60 exposed.

As shown in FIG. 5, the second conductive layer 60 is formed narrow and the third conductive layer 61 formed wide while the branch electrodes 11b and 12b are formed of the third conductive layer 61, such that it is possible to effectively reduce the use amount of the second conductive layer 60.

The first conductive layer 62, the second conductive layer 60, and the third conductive layer 61 are made of printable materials, and it is preferable that the first conductive layer 62 be made of a conductive material containing carbon, the second conductive layer 60 be made of a conductive material containing silver, and the third conductive layer 61 be made of a conductive material containing carbon and having an electrical resistance value higher than the first conductive layer 62.

The first conductive layer 62 and the third conductive layer 61 are formed by printing carbon paste. The carbon paste is produced by mixing a fine carbon filler, such as carbon black, carbon fiber, and carbon natotube, into binder resin solution. The carbon black can be used independently or by mixing two or more kinds of carbon black or carbon black having different grain diameters. The first conductive layer 62 and the third conductive layer 61 can be formed by screen-printing carbon paste in accordance with the shapes of the electrodes and dry-curing or heat-curing the carbon paste.

As described above, although the first conductive layer 62 is smaller electrical resistance value than the third conductive layer 61, it is possible to reduce the electrical resistance value by increasing the amount of carbon contained in the first conductive layer 62 more than the third conductive layer 61.

Silver paste containing a power-state silver filler in molten binder resin is used for the second conductive layer 60 and a pattern of the electrode is formed by screen-printing and then dry-hardened or heat-hardened.

In the embodiment, as shown in FIGS. 3, 4, and 5, the Y-driving electrode 11 and the detection electrode 12 are formed in the stacked layer structure of the second conductive layer 60 and the third conductive layer 61. Since the characteristics and functions required for the Y-driving electrode 11 are the same as those of the X-driving electrode 13, the Y-driving electrode 11 can be formed of the first conductive layer 62, similar to the X-driving electrode 13.

However, since the Y-driving electrode 11 is formed on the same forming surface as the detection electrode 12 in the embodiment, it can simplify the manufacturing process to forming the Y-driving electrode 11 and the detection electrode 12 from the same on the same layer, rather than on different layers, such that it is possible to reduce manufacturing costs.

The thicknesses of the conductive layers 60 to 62 are, for example, about several μm to tens of μm. Further, the electrode widths of the first conductive layer 62 to the third conductive layer 61 are, for example, 0.3 mm to 0.7 mm and the electrode width of the second conductive layer 60 is around 0.1 mm for example.

In the embodiment, although the X-driving electrode 13 is formed in a single layer structure of the first conductive layer 62, however the X-driving electrode 13 may be formed that a protective layer or the like is disposed on the upper surface or a base layer is disposed on the lower surface together with the the first conductive layer 62. Further, in the embodiment, although the Y-driving electrode 11 and the detection electrode 12 are formed in a stacked structure of the second conductive layer 60 and the third conductive layer 61, a protective layer may be disposed on the upper surface together with the conductive layers 60 and 61 or a base layer may be disposed on the lower surface.

Further, in the embodiment, although it is possible to improve the accuracy of position detection by disposing the branch electrode portions 11b and 12b at the Y-driving electrode 11 and the detection electrode 12, the branch electrode portions 11b and 12b are selectively disposed, and when the branch electrode portions 11b and 12b are not disposed, the third conductive layer 61 is formed at the electrode main body portions 11a and 12 wider than the second conductive layer 60.

Further, in the embodiment, the circuit portion 21 is formed at the rear side 3 of the capacitance type input device 1 while the ground layer 17 and the circuit wiring layer 19 are formed at the circuit portion 21. As shown in FIGS. 2, 3, 4, and 7, the ground layer 17 increases the shield effect by widening the formation region while the circuit wiring layer 19 is formed within a limited range in comparison to the ground layer 17. The ground layer 17 is required to have low resistance, but the printing accuracy may be low. On the other hand, the circuit wiring layer 19 is required to have low resistance and a narrow pitch. In the embodiment, the wide ground layer 17 is formed of a conductive layer different from the circuit wiring layer 19 such that a material cheaper than the circuit wiring layer 19 can be selected for the ground layer 17, such that it is possible to form the ground layer 17 and the circuit wiring layer 19 in a layer configuration according to necessary functions and reduce costs.

In detail, a fourth conductive layer 65 of the ground layer 17 is made of a conductive material containing gold and a fifth conductive layer 66 of the circuit wiring layer 19 is preferably made of a conductive material having an electrical resistance value lower that the fourth conductive layer 65.

For example, it is possible to reduce resistance by increasing the silver filler contained in the fifth conductive layer 66 more than the fourth conductive layer 65.

Further, in the embodiment, it is possible to use the same material having low resistance for the second conductive layer 60 and the fifth conductive layer 66.

The thicknesses of the fourth conductive layer 65 and the fifth conductive layer 66 are about several μm to tens of μm.

As shown in FIGS. 3 and 4, the sensor side insulating layer 14 is formed in a three-layer structure. As shown in FIGS. 3, 4, and 6, the lowermost layer of the sensor side insulating layer 14 is an extending insulating layer 70 extending in the Y1-Y2 direction and positioned under the X-driving electrode 13. As shown in FIG. 6, the width (the dimension in the X1-X2 direction) of the extending insulating layer 70 is larger than the width of the X-driving electrode 13.

Cross insulating layers 71 and 72 are formed at the intersections of the X-driving electrode 13 and the Y-driving electrode 11, and the X-driving electrode 13 and the detection electrode 12, on the extending insulating layer 70, as shown in FIG. 6.

As shown in FIG. 6, the area of the cross insulating layer 71 at the lower position is larger than the area of the cross insulating layer 72 at the upper position.

As shown in FIGS. 3, 4, and 6, the sensor side insulating layer 14 is not formed to cover the entire upper surfaces of the Y-driving electrode 11 and the detection electrode 12, but the sensor side insulating layer 14 is formed only at a minimal region for keeping the insulation between the X-driving electrode 13 and the Y-driving electrode 11 and between the X-driving electrode 13 and the detection electrode 12. However, the cross insulating layers 71 and 72 are formed to overlap each other in order to ensure high insulation due to the intersections of the X-driving electrode 13 and the Y-driving electrode 11, and the X-driving electrode 13 and the detection electrode 12. In the embodiment, although the cross insulating layers 71 and 72 are formed in two layers, a single layer or more than two layers may be used if it is possible to ensure a desired thickness.

Therefore, it is possible to suppress forming of the sensor side insulating layer 14 in a necessary minimum region, with high insulation, and reduce costs.

In the embodiment, the extending insulating layer 70 is made of an insulating material having a high adhesiveness with respect to the conductive layers and the cross insulating layers 71 and 72 are preferably made of an insulating material that has high insulation and a high adhesiveness that is not smaller than that of the extending insulating layer 70. Although a resist material can be used for both the extending insulating layer 70 and the cross insulating layers 71 and 72, it is possible to appropriately form the sensor side insulating layer 14 in a stacked structure of the extending insulating layer 70 and the cross insulating layers 71 and 72 by separately using a resist material having a high adhesiveness and a resist material having high insulation rather than adhesiveness, for products on the market.

All of the insulating layers 70, 71, and 72 are formed to have a thickness of several μm to tens or μm. Further, although the extending insulating layer 70 is formed along the X-driving electrode 13 in FIG. 6, it may be formed along the surface of the Y-driving electrode 11 and the surface of the detection electrode 12. However, when the total number of the Y-driving electrodes 11 and the detection electrodes 12 is larger than that of the X-driving electrodes 13 and the extending insulating layer 70 is correspondingly formed along the Y-driving electrodes 11 and the detection electrodes 12, the formation region of the extending insulating layer 70 increases, the height difference of the forming surfaces of the X-driving electrodes 13 reaches the surface of the cross insulating layer 72 from the surface of the film base material 10 and increases, and accordingly, it is preferable to form the extending insulating layer 70 under the X-driving electrode 13 in the embodiment.

As shown in FIGS. 3 and 4, the circuit side insulating layer 18 is also formed in a three-layer structure, similar to the sensor side insulating layer 14.

The circuit side insulating layer 18 is formed in a stacked structure of a wide insulating layer 73 covering the ground layer 17, a partial insulating layer 75 limited in range in comparison to the wide insulating layer 73 and positioned between the wide insulating layer 73 and the circuit wiring layer 19, and an intermediate insulating layer 74 positioned between the wide insulating layer 73 and the partial insulating layer 75 and formed in the same size as the partial insulating layer 75.

The wide insulating layer 73 covers the entire surface of the ground layer 17, as shown in FIG. 7. On the other hand, the partial insulating layer 75 and the intermediate insulating layer 74 are formed in the range surrounded by a dotted line in FIG. 7, that is, only in a minimum region overlapping the circuit wiring layer 19, the IC package 27, and the connector portion 29 shown in FIG. 2.

Therefore, it is possible to suppress forming of the circuit side insulating layer 18 in a necessary smallest region, with high insulation, and reduce costs.

The wide insulating layer 73 is made of an insulating material having higher insulation than the partial insulating layer 75 and the partial insulating layer 75 is preferably made of an insulating material having higher insulation than the wide insulating layer 73. The intermediate insulating layer 74 positioned between the wide insulating layer 73 and the partial insulating layer 75 is made of an insulating material having high insulation, similar to the wide insulating layer 73.

Accordingly, it is possible to ensure high insulation between the ground layer 17 and the circuit wiring layer 19. Further, it is possible to appropriately ensure adhesiveness between the circuit wiring layer 19 composed of several wiring patterns with a small pitch or the mounting land portion and the insulating layer.

Although a resist material can be used for all the wide insulating layer 73, intermediate insulating layer 74, and partial insulating layer 75, it is possible to appropriately form the circuit side insulating layer 18 in a stacked structure of the wide insulating layer 73, intermediate insulating layer 74, and partial insulating layer 75 by separately using a resist material having a high adhesiveness and a resist material having high insulation rather than adhesiveness, for products on the market.

When it is possible to ensure high insulation only with the wide insulating layer 73, it is possible to remove the intermediate insulating layer 74. Further, it is possible to make the layer configuration of the circuit side insulating layer 18 three or more layers.

All of the insulating layers 73, 74, and 75 are formed to have a thickness of several μm to tens or μm.

For example, it is possible to use the same insulating material for the extending insulating layer 70 and the partial insulating layer 75 and use the same insulating material for the cross insulating layers 71 and 72, the wide insulating layer 73, and the intermediate insulating layer 74.

It should be understood by those skilled in the art that various modifications, combinations, sub-combinations and alterations may occur depending on design requirements and other factors insofar as they are within the scope of the appended claims of the equivalents thereof.

What is claimed is:

1. A capacitance type input device that includes a detection electrode and a first driving electrode where voltage is applied, which are stacked through a sensor side insulating layer, at the sensor portion side of a film base material, and detects a change in capacitance between the input device and the first driving electrode by using the detection electrode,
wherein the first driving electrode comprises a first conductive layer and the detection electrode is formed in a stacked structure of a second conductive layer having a resistance lower than the first conductive layer and a third conductive layer having a resistance higher than the first conductive layer and the second conductive layer.

2. The device according to claim 1,
wherein the first conductive layer is made of a conductive material containing carbon, the second conductive layer is made of a conductive material containing silver, and the third conductive layer is made of a conductive material containing carbon and having an electrical resistance value higher than the first conductive layer.

3. The device according to claim 1,
wherein the electrode width of the third conductive layer is larger than the electrode width of the second conductive layer.

4. The device according to claim 1,
wherein the second conductive layer extends straight, the third conductive layer has an electrode body portion overlapping the second conductive layer and extending straight with a width larger than the second conductive layer and a branch electrode portion perpendicular to the electrode body portion and shorter than the electrode body portion.

5. The device according to claim 1,
wherein a second driving electrode is perpendicular to the first driving electrode opposite to the first driving electrode through the sensor side insulating layer, on the same forming surface as the detection electrode, and formed of the same conductive layer as the detection electrode.

6. The device according to claim 1,
wherein the sensor side insulating layer is formed in a stacked structure of an extending insulating layer formed along one electrode opposite to the stacking direction and a cross insulating layer formed at an intersection of the electrodes opposite to the stacking direction.

7. The device according to claim 6,
wherein the extending insulating layer is made of an insulating material having a higher adhesiveness than the cross insulating layer and the cross insulating layer is made of an insulating material having higher insulation than the extending insulating layer.

8. The device according to claim 1,
wherein a ground layer, a circuit side insulating layer, and a circuit wiring layer are sequentially stacked in order from the film base material, at the circuit portion side at the opposite side to the sensor portion side of the film base material, the ground layer is formed in a range wider than the circuit wiring layer, and the ground layer and the circuit wiring layer are formed of different conductive layers.

9. The device according to claim 8,
wherein a fourth conductive layer of the ground layer is made of a conductive material containing silver and a fifth conductive layer of the circuit wiring layer is made of a conductive material containing silver and having an electrical resistance value lower than the fourth conductive layer.

10. The device according to claim 8,
wherein the circuit side insulating layer is formed in a stacked structure of a wide insulating layer covering the ground layer and a partial insulating layer having a more limited range in comparison to the wide insulating layer and positioned between the wide insulating layer and the circuit wiring layer.

11. The device according to claim 10,
wherein the wide insulating layer is made of an insulating material having higher insulation than the partial insulating layer and the partial insulating layer is made of an insulating material having a higher adhesiveness than the wide insulating layer.

* * * * *